United States Patent [19]

Bannister

[11] Patent Number: 4,554,661
[45] Date of Patent: Nov. 19, 1985

[54] GENERALIZED FAULT REPORTING SYSTEM

[75] Inventor: Richard J. Bannister, Newtown Square, Pa.

[73] Assignee: Burroughs Corporation, Detroit, Mich.

[21] Appl. No.: 547,339

[22] Filed: Oct. 31, 1983

[51] Int. Cl.$^4$ ............................................. G01R 31/28
[52] U.S. Cl. ......................................... 371/15; 371/29
[58] Field of Search ....................... 371/15, 20, 25, 29; 324/73 R, 73 AT, 73 PC; 364/200, 900

[56] References Cited

U.S. PATENT DOCUMENTS 4,062,061 12/1977 Batchelor et al. ................... 364/900
4,521,847 6/1985 Ziehm et al. ........................ 371/7 X Primary Examiner—Charles E. Atkinson
Attorney, Agent, or Firm—Francis A. Varallo; Mervyn L. Young; Kevin R. Peterson

[57] ABSTRACT

The present disclosure describes a system for handling detected error signals, providing the circuit elements for processing fault reports and implementing automatic fault isolation. More specifically, the system develops a fault report for each component based upon error signals derived therefrom. Changes in the fault report are detected and selector circuits are actuated to automatically isolate the fault to the particular component or components, or to reset the system in response to previous fault correction. The present system is advantageous in that it is independent of the equipment technology and applies to all design levels, from the unit itself to the individual components of which it is comprised.

15 Claims, 17 Drawing Figures

Fig. 7
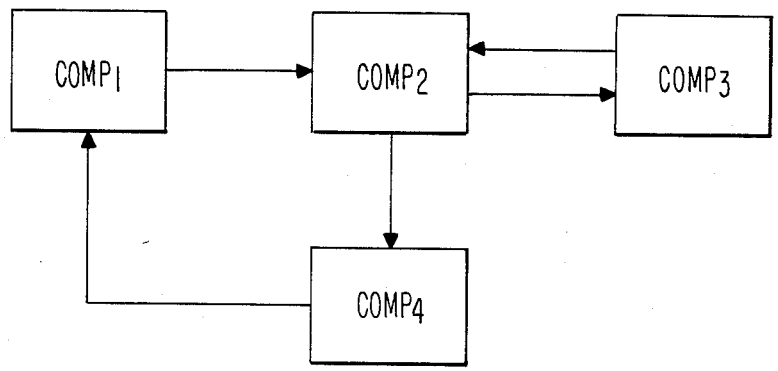
Fig. 8
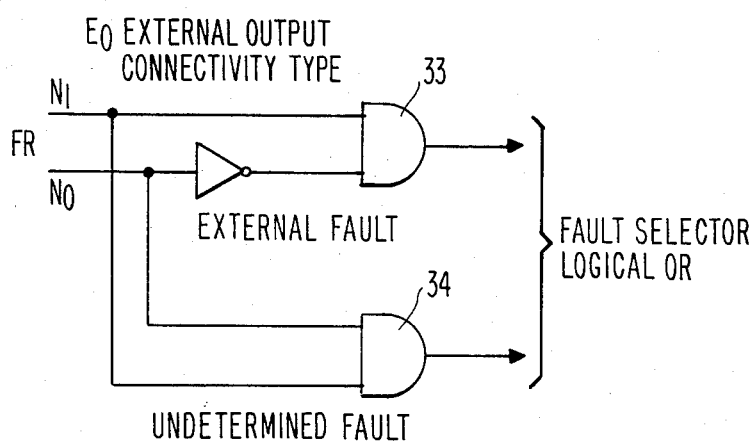
Fig. 9

GENERALIZED FAULT REPORTING SYSTEM

BACKGROUND OF THE INVENTION

The accurate isolation of electrical component faults which may occur in complex equipments and systems, such as electronic data processors, is of prime importance. Presently, techniques have been developed for detecting such faults and for recording fault histories. However, such techniques are generally limited in scope, do not address fault isolation at a system level and lack general application. A need has existed for a generalized fault reporting technique that is independent of the design technology and is applicable to all levels of the system implementation, such as the unit itself, card module level, or integrated circuit chip component level.

The system described and claimed herein fills such a need. Additionally, the present system offers the advantages of being independent of the fault or error detection technique and of being applicable to any operating equipment independent of its function and operation. The system also provides a relatively low cost method for accurate automatic fault isolation and may be applied to automatic equipment reconfiguration.

SUMMARY OF THE INVENTION

In accordance with the present invention, error signals originating within the operating equipment, and generated by any convenient error detection technique, are encoded by a Fault Report Encoder. The latter classifies the error signals as being "internal", originating on the component; "external" originating on a component but derived from an error transmitted thereto by an interconnecting component; and "undetermined", in which the accurate origin of the fault is unknown. The encoding of the faults results in the generation of a "fault report" for each component.

The "fault reports" are applied to a Fault Status Filter which comprises a filter circuit for each "fault report". The purpose of the latter circuit is to compare the present "fault report" with the preceding report. A change in the "fault reports" is detected by the Fault Status Filter and serves to trigger the Fault Selector. The latter comprises an Interconnection Matrix, whereby the components on the same system level are interconnected. Two connecting types, "internal" and "external output" represented by logic circuits, account for the four possible states included in the "fault report". The Fault Selector isolates the detected fault to the correct component. Alternatively, if the preceding fault report indicates the presence of errors and the present report shows a no fault condition, indicative of a connection having been made, the trigger signal applied to the Fault Selector serves to reset the present system to a no-fault state.

The present system offers a significant number of advantages. For example, it employs a simplified two-line reporting technique during on-line operation. It is independent of the operating mode of the equipment under test and is compatible with diverse error detection methods. The system covers potentially all possible fault conditions. Moreover it may be implemented on any desired scale. All of the foregoing are achieved in a low-cost environment.

Other features and advantages of the present invention will become apparent in the detailed description thereof which follows.

BRIEF DESCRIPTION OF THE DRAWINGS

FIG. 7 is an example of the interconnection of components utilized in implementing the Fault Selector of FIG. 6.

FIG. 8 represents the Interconnection Matrix corresponding to the example of FIG. 7.

FIGS. 9 and 10 illustrate respectively logic circuits for external output and internal connectivity types utilized in the Fault Selector of FIG. 6.

DESCRIPTION OF THE PREFERRED EMBODIMENT

Figure 1:
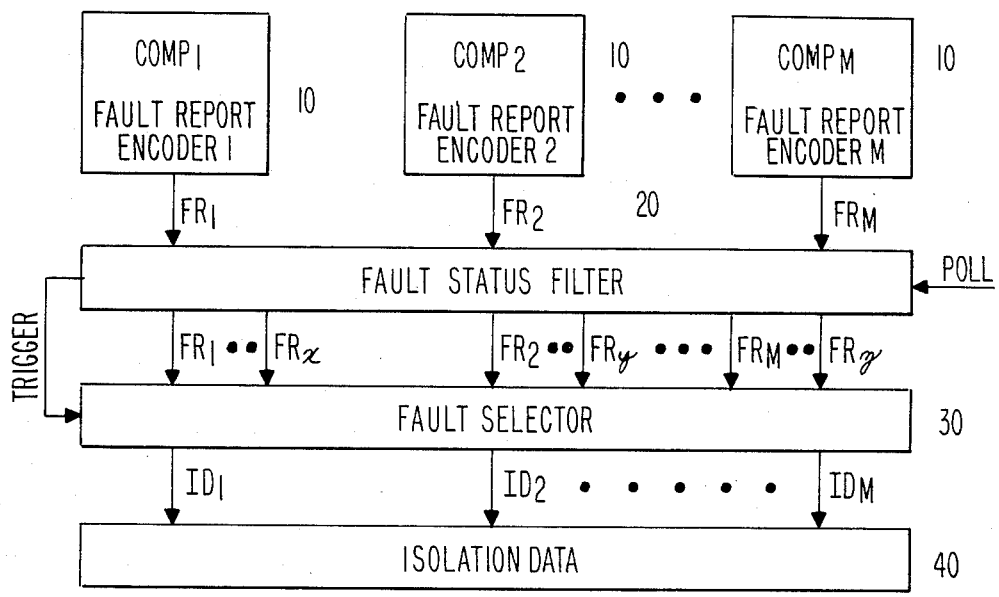
FIG. 1 is a block diagram of the overall generalized fault reporting system of the present invention.

FIG. 1 illustrates the overall block diagram of the generalized fault reporting system of the present invention. With reference to the last mentioned figure, a brief summary of the operation of the invention follows. The detected error signals in each component, designated respectively $COMP_1$, $COMP_2$ . . . $COMP_M$, are encoded in corresponding FAULT Report Encoders 10. A fault report FR, is developed for each component. The fault reports $FR_1$, $FR_2$ . . . $FR_M$, where the subscripts identify the respective components, are applied to a Fault Status Filter 20 in which the present fault reports are compared to the preceding reports. Changes in the reports are detected, resulting in the application of a TRIGGER pulse to the Fault Selector module 30. The latter comprises a plurality of logic circuits for automatically isolating the fault to the correct component or components, if the change in the fault reports indicates the occurrence of an error. On the other hand, if a correction has been made in a component since the recording of the preceding fault, the Fault Selector will reset the system to indicate that the repair or correction has been made. Each of the foregoing sections which comprise the present system are described hereinafter, both with respect to their construction and operation.

Figure 2:
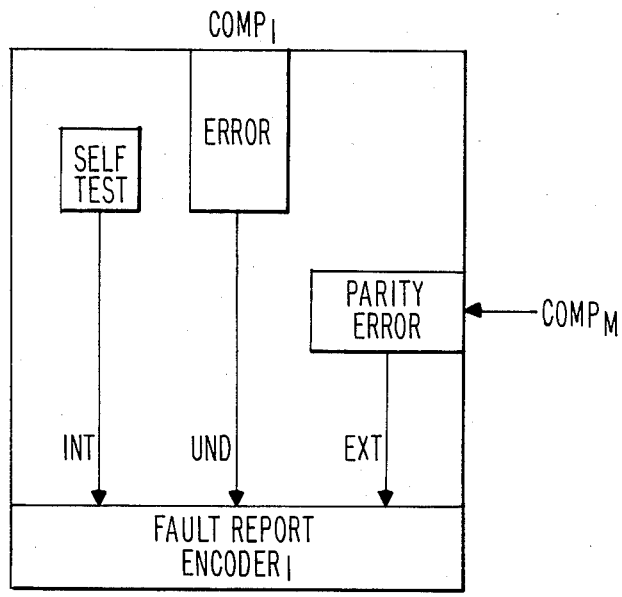
FIG. 2 depicts samples of detected error signals.
Figure 3:
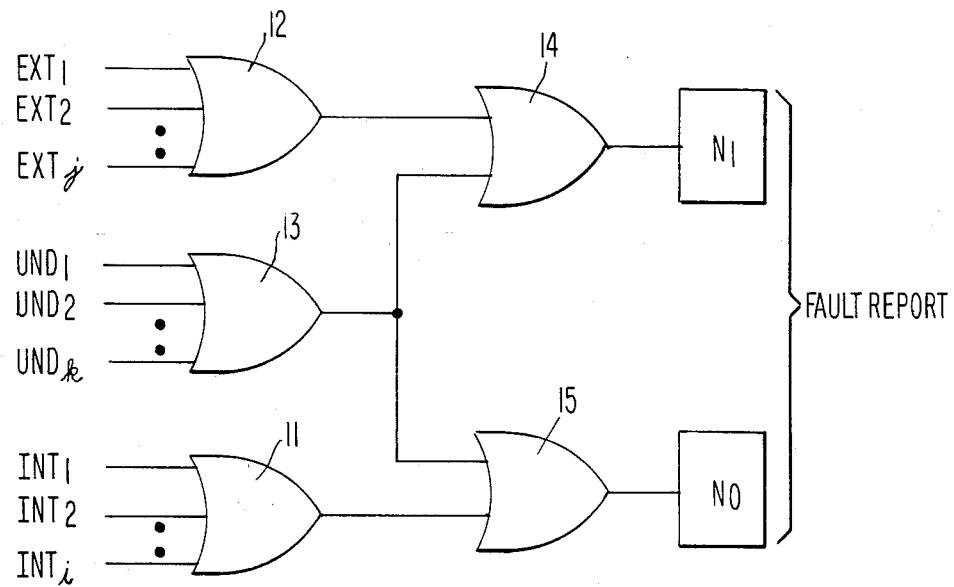
FIG. 3 is a logic diagram of the Fault Report Encoder section of FIG. 1.

The Fault Report Encoder 10 is best understood with reference to FIGS. 2 and 3. FIG. 2 shows samples of the detected error signals. The latter are assumed to be those generated by any convenient error detection technique. Each detected error signal is classified as belonging to one of the three fault sources, namely, INT, for an internal fault wherein the detected error signal originates on the component; EXT, for an external fault, wherein the detected error signal is generated on the given component and detects an error transmitted to this component by an interconnecting component; and UND, for an undetermined fault, the accurate origin of which cannot be determined.

With reference to FIG. 3, the Fault Report Encoder 10 is implemented by the logical ORing of the detected error signals classified as indicated in FIG. 2. Thus, all of the internal faults for a given component are applied to OR gate 11; the external faults, to OR gate 12; and the undetermined faults to OR gate 13. The outputs of OR gates 11 and 12 are applied respectively to one input of each of a pair of OR gates 14 and 15. The output of OR gate 13, relating to the undetermined faults is applied in common to both OR gates 14 and 15. It is assumed that the detected error signals are, or have been converted to, a logical "true" value to indicate the occurrence of the fault. A fault report comprised of two signals $N_1$ and $N_0$ is generated by the given component, for example $COMP_1$. If $N_1$ and $N_0$ are both logically "false", for example a binary "0", then no fault has been detected. If $N_1$ is "false" and $N_0$ is "true" (for example, a binary "1"), an internal fault is reported; if $N_1$ is "true" and $N_0$, "false", an external fault has been detected; and if both $N_1$ and $N_0$ are "true" an undetermined fault is reported. It should be noted that separate internal and external faults can occur and these are merged into the equivalent undetermined fault report. The "no fault" condition is representative of the initial preset status of the component.

Figure 4:
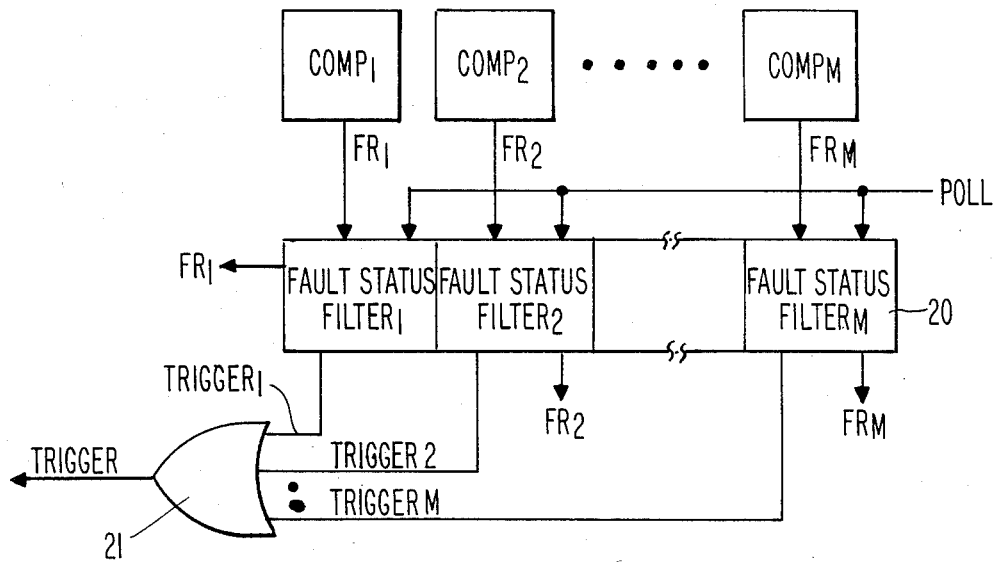
FIG. 4 is a block diagram of the Fault Status Filter section of FIG. 1.

Thus far, a fault report, FR, comprised of the signals $N_1$ and $N_0$ has been generated by the fault report encoder 10. Each fault report, FR, is then applied to a corresponding Fault Status Filter 20 as seen in FIG. 4. It should be observed that there is one Fault Status Filter 20 for each fault report, and one of the latter for each component under test. Thus, in FIG. 4, the "M" components designated respectively $COMP_1$, $COMP_2$, ..., $COMP_M$, have respective fault reports $FR_1$, $FR_2$ . . . $FR_M$. The POLL signal, which may be a strobe or a clock-type signal, is applied in common to all of the Fault Status Filters 20. Each Fault Status Filter 20 generates a TRIGGER signal designated by a subscript corresponding respectively to those of the components. The TRIGGER signals are logically ORed in gate 21 and the output of the latter is applied to the Fault Selector 30 (FIG. 6) as will be described hereinafter.

Figure 5:
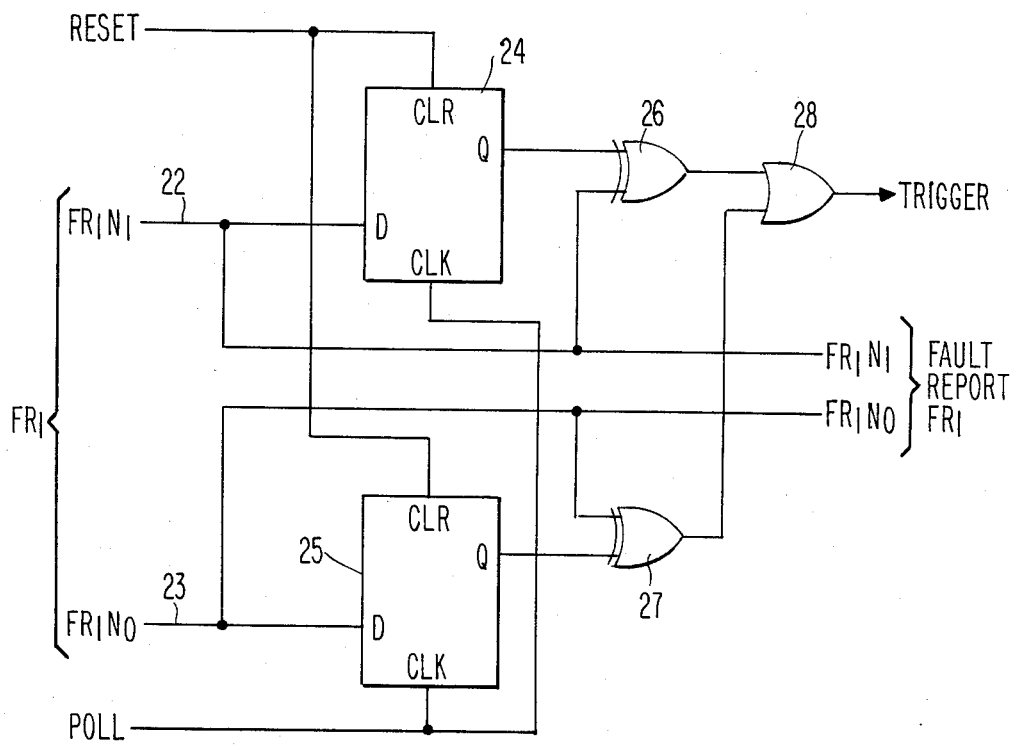
FIG. 5 illustrates in detail the circuit configuration of the Fault Status Filter.

FIG. 5 is a circuit diagram for the Fault Status Filter of FIG. 4, the other Filters being identical thereto. A purpose of the Fault Status Filter Circuit of FIG. 5 is to compare the present fault report with the preceding one. This is accomplished as follows. The $N_1$ and $N_0$ signals of the fault report FR, are applied via lines 22 and 23 respectively to the "D" terminals of a pair of D-type flip-flops 24 and 25. The former signals are also applied to one of a pair of input terminals of the respective exclusive-OR gates 26 and 27. The "Q" output terminals of flip-flops 24 and 25 are coupled respectively to the other input terminals of the gates 24 and 25. A POLL or strobe pulse is applied in common to the "CLK" terminals of flip-flops 22 and 23.

In operation, the flip-flops 22 and 23 store the preceding fault report and the signal level on the "Q" terminals thereof is indicative of the report. If the current $N_1$ and $N_0$ signals are identical to the preceding ones, the signal levels on the pair of input terminals of each of the gates will be the same, and there will be no output TRIGGER signal derived therefrom. If however, the current $N_1$ or $N_0$ are different from the preceding signals, one or both of the gates 26 and 27 will generate an output, which after buffering in OR gate 28 forms the $TRIGGER_1$ pulse. The POLL pulse causes the flip-flop to respond to the respective signals on their "D" terminals, and to assume a corresponding stable state. The flip-flops 22 and 23 may be RESET by a pulse of suitable polarity applied in common to the CLR terminals thereof.

Figure 6:
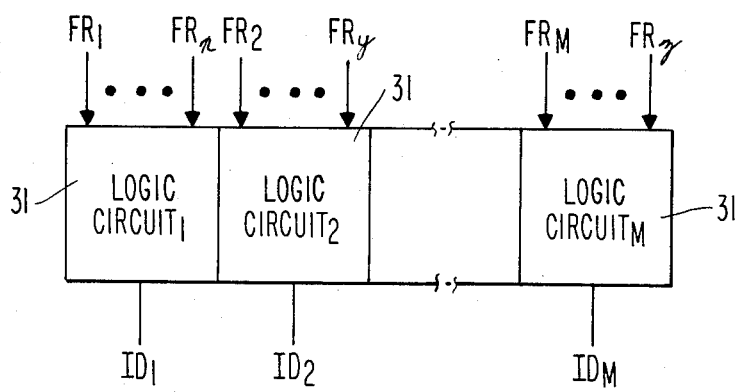
FIG. 6 is a block diagram of the Fault Selector section of FIG. 1.

The block diagram of FIG. 6 is an overall view of the Fault Selector 30 of the present system. Briefly, the Fault Selector is comprised of the Logic Circuits 31 required to perform the automatic isolation of faults. The Logic Circuits 31 are divided into "M" partitions, each partition bearing a subscript number which represents the actual circuit that contributes to the isolation of a fault to a particular component.

The Logic Circuits 31 result from a systematic method involving the interconnection of components at the same system level. Thus, Logic $Circuit_1$, receives a plurality of fault reports, $FR_1$ . . . $FR_x$, derived respectively from $COMP_1$ and other components interconnected therewith, as will be explained in detail hereinafter. The interconnection of components is represented by an Interconnection Matrix 32, an example of which appears in FIG. 8. The Interconnection Matrix 32 is the fundamental element of the Fault Selector 30. It provides the information utilized to generate the Logic Circuits 31 of the Fault Selector 30. The Interconnection Matrix 32 may be developed manually or by a computer aided design process. The output signals, that is Isolation Data such as ID, identify the component responsible for the fault.

An interconnection of components at the same system level is illustrated by way of example, in FIG. 7. Four components are involved, namely, $COMP_1$, $COMP_2$, $COMP_3$, and $COMP_4$.

FIG. 8 illustrates the Interconnection Matrix 32 for the example of FIG. 7. Each row of the Interconnection Matrix 32 consists of the types of connectivity that the row component has with all of the column components, that is, with all other components. There are four types of connectivity possible by this definition. With continued reference to FIGS. 7 and 8, the symbols in the latter figure represent the following: "N" is for No connectivity; "I" for Internal connectivity; "$E_I$", for an External Input from a column component; and "$E_0$" for an External Output to a column component. The symbol "$E_{IO}$" is used to indicate that both the "$E_I$" and "$E_0$" connectivity types apply, such as a bidirectional bus or two separate connections. In the present system, it should be noted that the actual number of lines of interconnection from one component to another is irrelevant. It is only necessary for one interconnection to be specified between any two components selected from the symbols defined hereinbefore.

Figure 10:
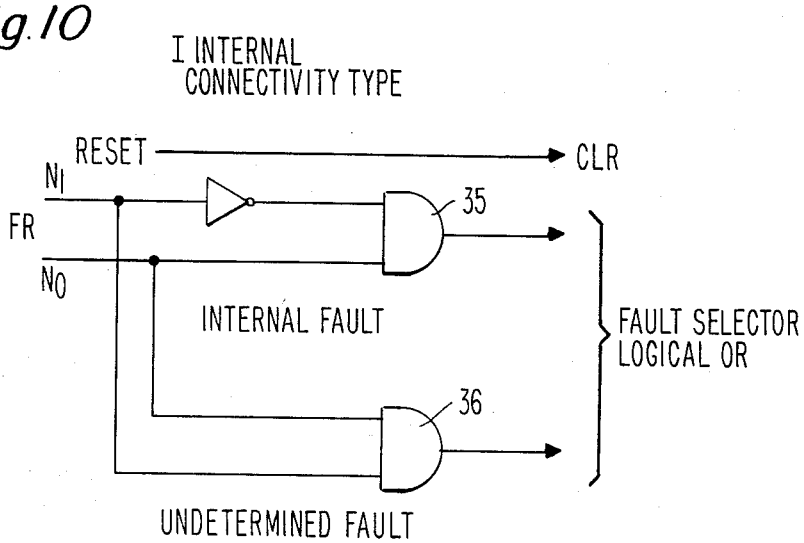

The four connectivity types represent the logic circuits used to implement the Fault Selector 30. FIGS. 9 and 10 depict the logic circuits respectively for the "$E_0$", External Output connectivity type and "I", Internal connectivity type. The "N", no connectivity and "$E_I$", external input types do not require any logic circuits.

Since the Fault Report (FR) has four possible states including combinations of $N_1$ and $N_0$, as discussed hereinbefore in connection with FIG. 3, the two connectivity type circuits of FIGS. 9 and 10 account for all of the states. For example, in FIG. 9, if the $N_1$ input is "true" and $N_0$, "false", an output is derived from AND gate 33, indicating the detection of the external fault. On the other hand if $N_1$ and $N_0$ are both "true", an output from AND gate 34, represents an undetermined fault. Similarly, in FIG. 10, if $N_1$ is "false", $N_0$, "true", an output from AND gate 35 represents the detection of an internal fault. If $N_1$ and $N_0$ are both "true", AND gate 36 provides an output indicating an undetermined fault. The outputs of all of the last mentioned AND gates are ORed together, as will be described hereinafter.

Each component of the Interconnection Matrix 32 of FIG. 8 comprises a partition of the logic circuits in FIG. 6 that correspond to the component in the Fault Selector 30. The specific circuit is represented by the Interconnection Matrix row for the component. The connectivity types (symbols N, $E_1$, I, $E_0$ and $E_{IO}$) in the row specify the logic elements of the last mentioned circuit. An additional OR circuit element contributes to the fault isolation.

With reference to FIG. 7, which is an example of component interconnections, the systematic process of constructing the Fault Selector 30 for such a component organization will now be described. The corresponding Interconnection Matrix 32 of FIG. 8 represents the logic circuits that implement the Fault Selector, and the latter will be constructed in accordance therewith.

Figure 11:
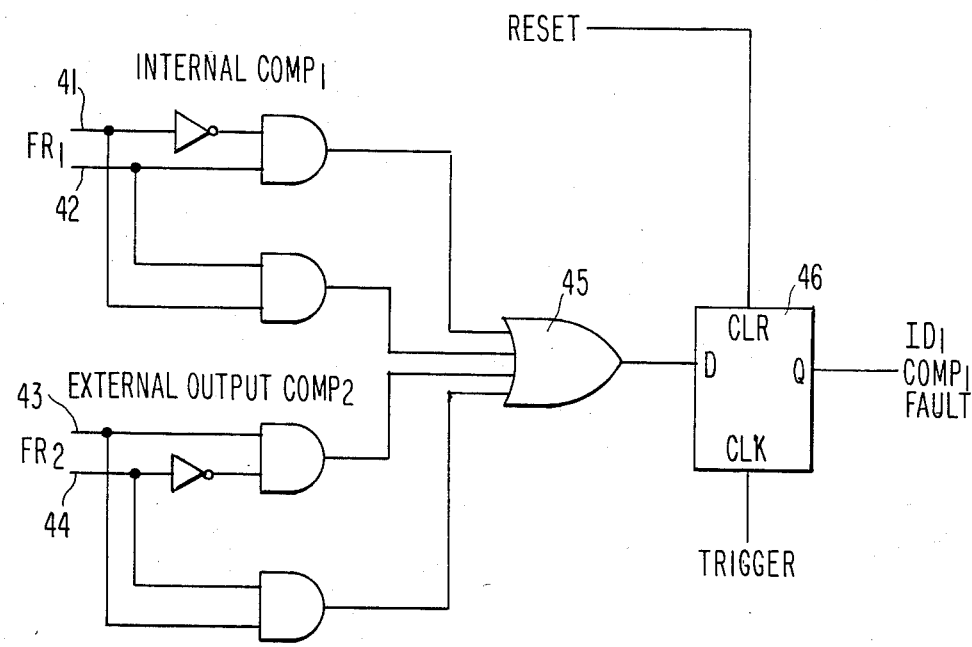
FIGS. 11, 12, 13 and 14 illustrate respectively the circuits corresponding to the connectivity of the four components appearing in the Interconnection Matrix of FIG. 8.

FIG. 11 is a logic circuit for the first row component, designated $COMP_1$ in FIG. 8. With reference to the Interconnection Matrix of the last mentioned figure, it is observed that $COMP_1$ has two components, that is, columns that contain either an Internal (I) or External output ($E_0$) connection. These contribute to the Logic Circuit 31 of FIG. 11 and comprise $COMP_1$, with an Internal connection and a second component $COMP_2$ with an External output thereto from $COMP_1$.

Logic Circuit$_1$ of FIG. 11 is comprised of the pair of logic circuits illustrated in FIGS. 9 and 10. The first of these is the logic circuit type depicted in FIG. 10 for I, internal connectivity. The inputs on lines 41 and 42 of this circuit are the elements of the fault report, $FR_1$. The second logic circuit is that of FIG. 9, for $E_0$, External output connectivity. The inputs to the latter circuit on lines 43 and 44 is the fault report, $FR_2$. The outputs of the two circuits in FIG. 11 are ORed in OR gate 45, the output of which is applied to the "D" terminal of flip-flop 46. As described hereinbefore in connection with FIGS. 4 and 5 (Fault Status Filter 20), a change in the fault report of a component results in the generation of a TRIGGER signal. The latter is applied to the CLK terminal of flip-flop 46. The output of flip-flop 46 on terminal "Q" represents Isolation Data for the first component $COMP_1$, and carries the symbol $ID_1$. The switching of flip-flop 46 to the "high" state in response to the TRIGGER pulse, is indicative of the occurrence of a fault in $COMP_1$. Reset means are coupled to the CLR terminal of flip-flop 46 for initialization of the system.

Figure 12:
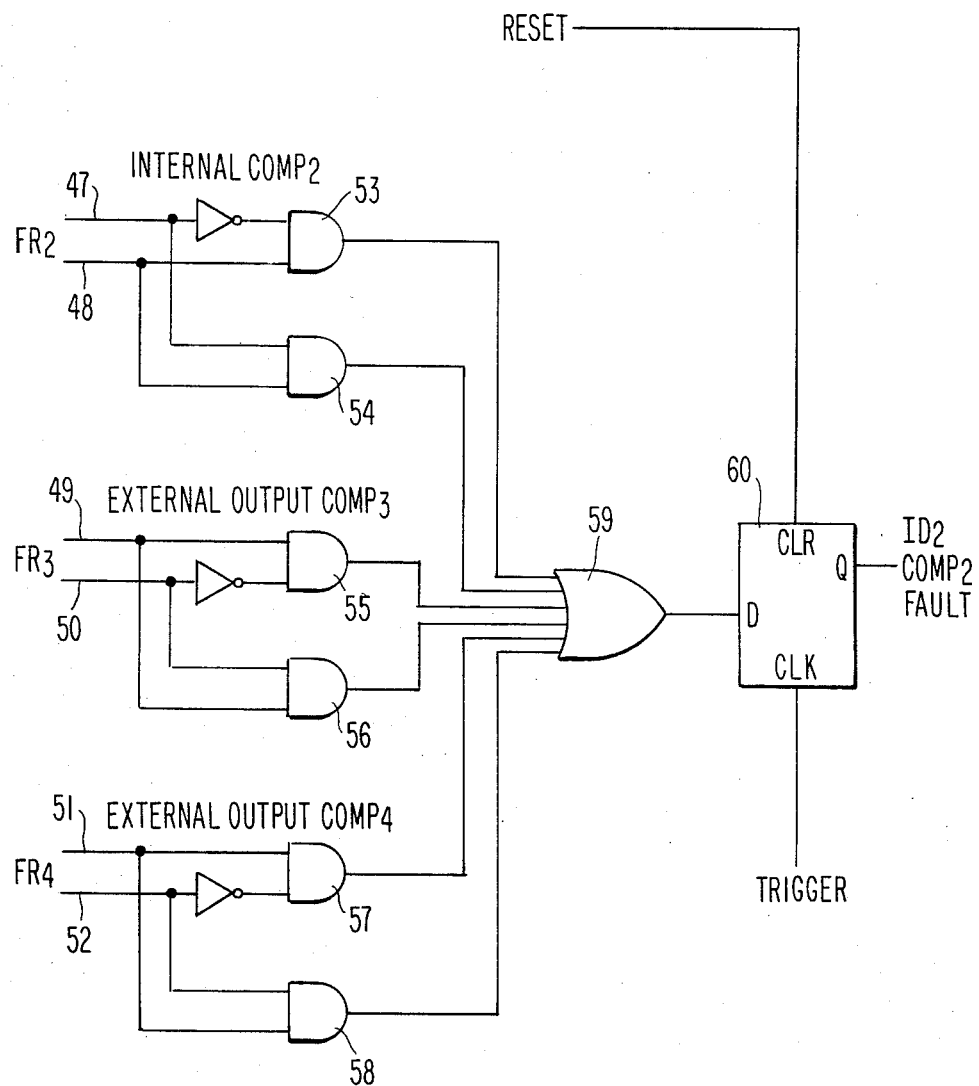

Continued reference to the Interconnection Matrix of FIG. 8, reveals that in the second row, $COMP_2$ has three components that contribute to the Logic Circuit 2 of FIG. 12. The three components consist of $COMP_3$ which has an External Output connection from $COMP_2$; $COMP_2$ which has an Internal connection; and $COMP_4$, which also has an External Output connection from $COMP_2$. With reference to the operation of the $E_0$ and I connectivity circuits of FIGS. 9 and 10 as described hereinbefore, the $N_1$ and $N_0$ elements of the Fault Report$_2$ for $COMP_2$ are applied to lines 47 and 48. Similarly $FR_3$ for $COMP_3$ appear on lines 49 and 50; $FR_4$ for $COMP_4$, on lines 51 and 52. Output signals from AND gates 53 through 58 inclusive are applied to OR gate 59. An output from the latter gate is applied to the D terminal of flip-flop 60. A TRIGGER signal is applied to the CLK terminal of flip-flop 60 and an output from the latter as seen on its Q terminal is indicative of $ID_2$, a fault related to $COMP_2$.

Figure 13:
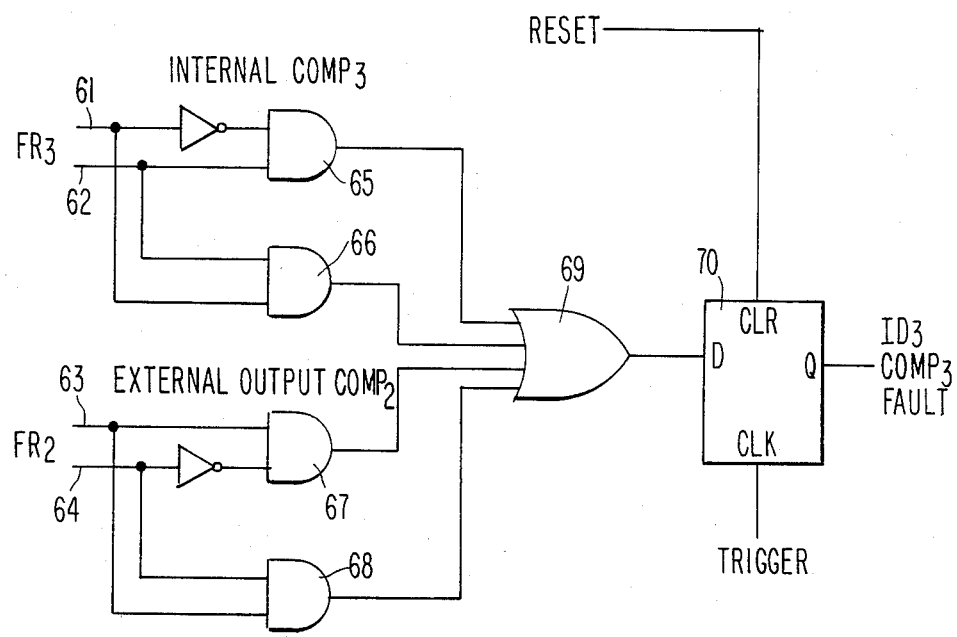

In like manner, for the third row of the Interconnection Matrix of FIG. 8, $COMP_3$ has an External Output connection to $COMP_2$ and has an Internal Connection to itself. FIG. 13 indicates that $FR_3$ is applied to lines 61 and 62; $FR_2$ to lines 63 and 64. Outputs from AND gates 65 through 68 inclusive are applied to OR gate 69 which in turn applies a signal to the D input terminal of flip-flop 70. The output on the Q terminal of the latter, upon the application of a TRIGGER signal to its CLK terminal, is indicative of a $COMP_3$ fault.

Figure 14:
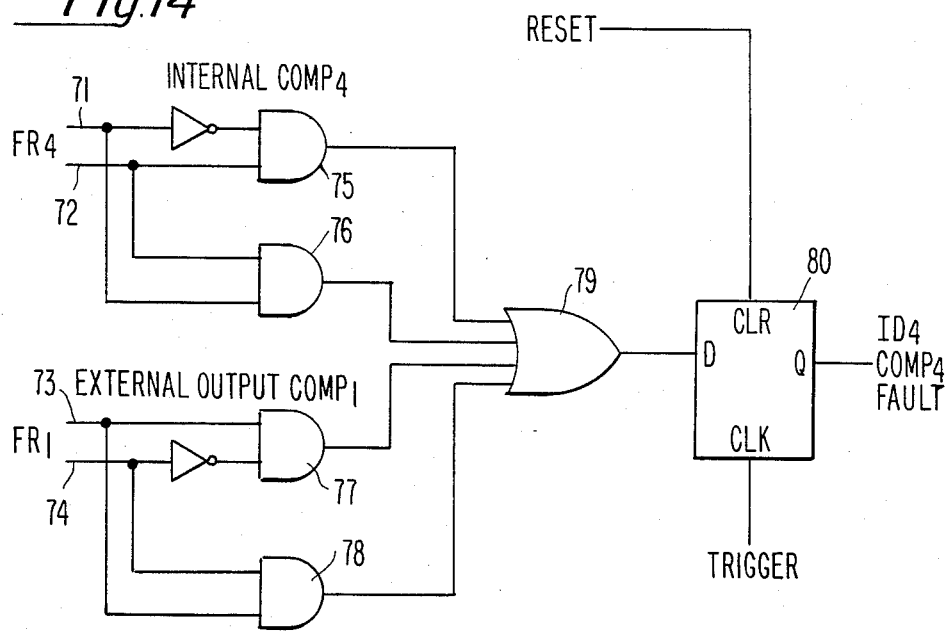

As to the fourth row of the Interconnection Matrix of FIG. 8, $COMP_4$ has an External Output connection to $COMP_1$ and an Internal Connection to itself. Reference to FIG. 14 illustrates the foregoing. The Fault Report, $FR_4$, is applied to lines 71, 72; the $FR_3$ to lines 73, 74. Outputs from AND gates 75 through 78 inclusive are applied to OR gate 79. The latter applies a signal to the D input terminal of flip-flop 80, which provides an output on its Q terminal at the TRIGGER time. The level on the Q terminal indicates a $COMP_4$ fault.

Figure 15:
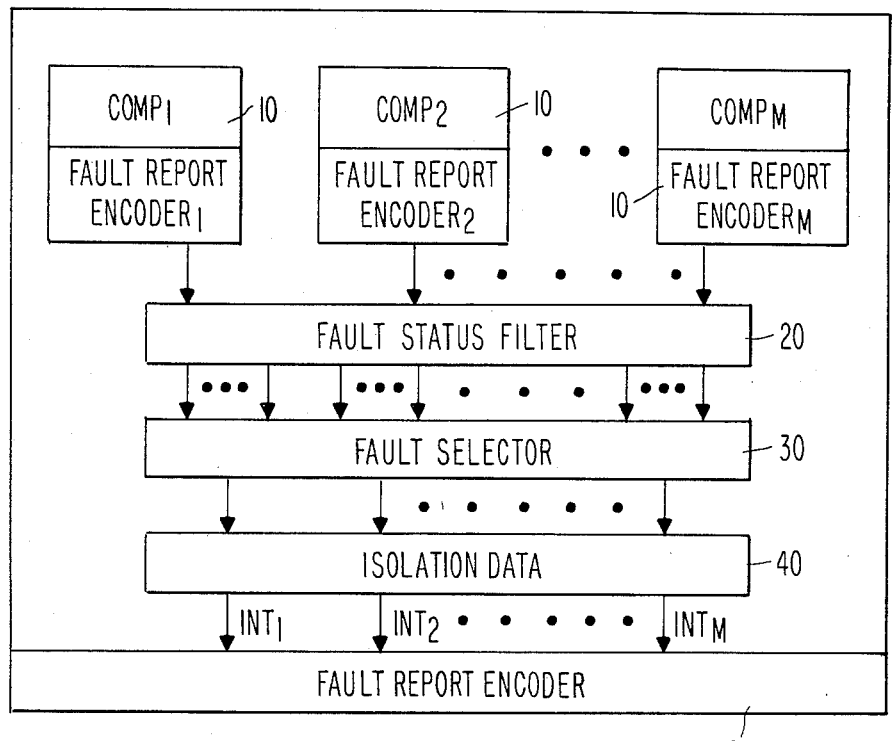
FIG. 15 depicts in block diagram form a recursive application of the present invention to a lower-bound system level.
Figure 16:
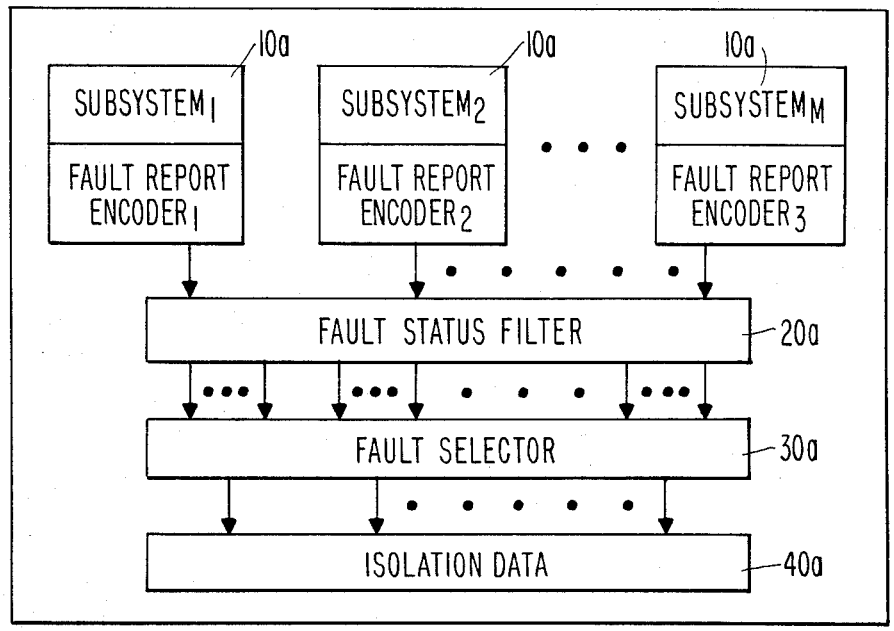
FIG. 16 is a block diagram of the recursive application of the present invention to an upper-bound system level.

FIGS. 15 and 16 relate to the expansion of the system described hereinbefore to make it applicable to the multiple levels of the electronic equipment in operation. Thus far, the implementation of the fault reporting system has been considered at the same equipment system level. Thus, the level has not been specified in order that it might represent any arbitrary level. The recursive use of the present system involves a definition of the lower and upper bounds of the equipment system levels. The latter are illustrated diagramatically in the respective FIGS. 15 and 16.

Consider FIG. 15 for the lower bound equipment system levels. The latter are comprised of the lowest system level, namely the component part or parts; and the second to the lowest system level, comprising the assembly of several component parts. Thus, the Fault Reports in 10 for the component parts that make up the lowest system level of implementation result in Isolation Data in module 40 by applying the techniques described hereinbefore. The Isolation Data serves two purposes. First, it isolates the fault to the component parts and this Isolation Data may be stored or used to drive an indicating device such as a light emitting diode. Second, it serves as an Internal fault detected error signal as characterized in FIG. 2, and provides an input to the second lowest system level Fault Encoder 10a.

FIG. 16 illustrates the upper bound system levels of the operating equipment. The latter levels are defined as the relationship between the highest system level, namely, the system itself, and the second to the highest system level, that is, the subsystem. With reference to FIG. 16, the fault reports from the encoder 10a in the subsystem level of implementation result in Isolation Data by operation of the generalized fault reporting system described hereinbefore. Thus Isolation Data in module 40a serves the sole purpose of isolating the fault to the subsystem component or components and represents the system level of implementation.

Figure 17:
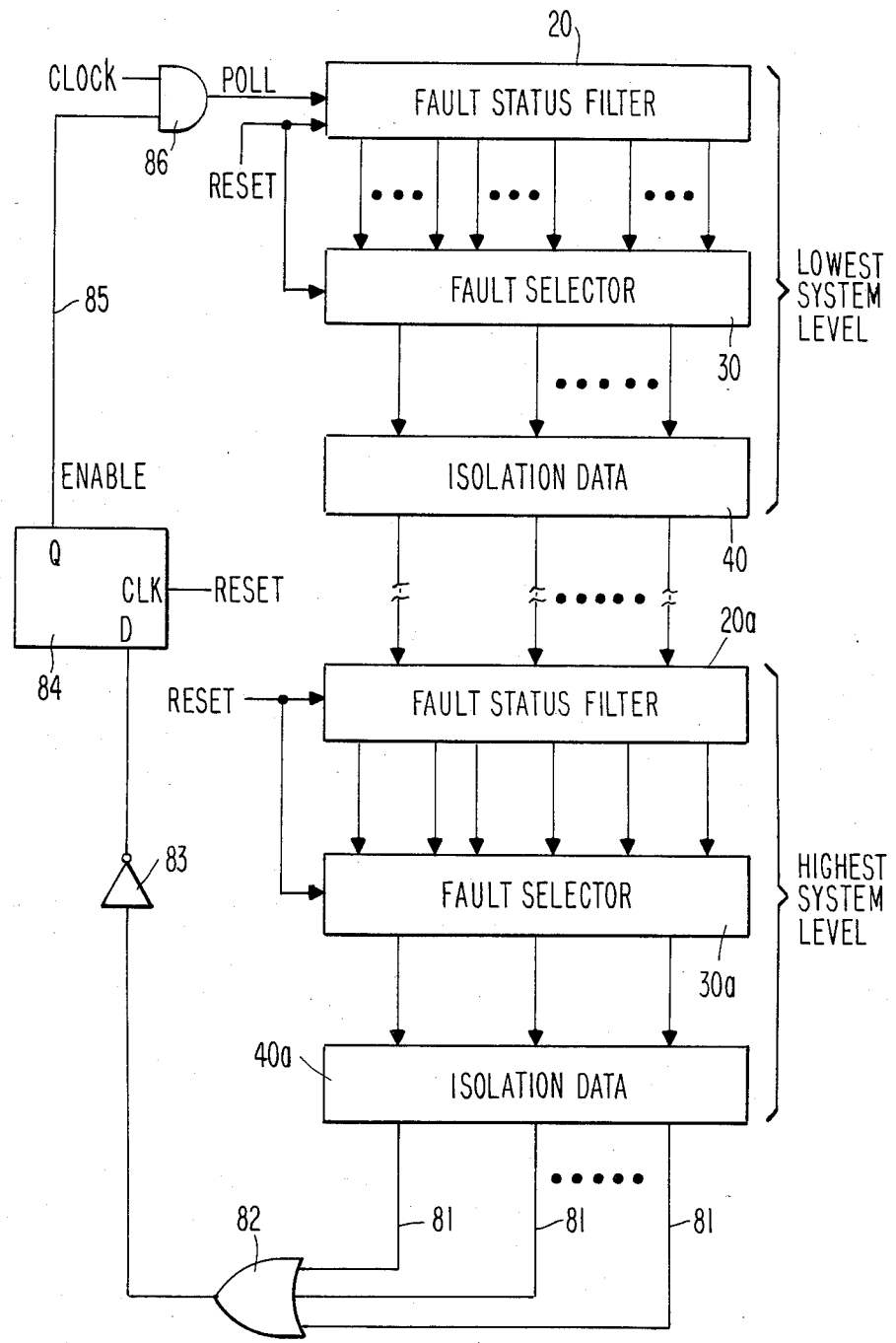
FIG. 17 illustrates the logic circuit configuration for initialization and recovery of the present fault reporting system.

FIG. 17 illustrates in simplified form the logic circuit organization for the initialization and self-test of the fault reporting system of the present invention. Although not shown, it is assumed that the Fault Status Filter 20 for each of the components in the lowest system level, receives a fault report (FR), as indicated in FIGS. 4 and 5. The initialization and recovery, or reinitialization of the system is implemented through the application of a RESET signal to appropriate circuit elements within the Fault Status Filter 20 and Fault Selector 30, as indicated hereinbefore. For example, with reference to FIG. 5, for the Fault Status Filter 20, the RESLT signal is applied in common to the CLR terminals of flip-flops 24 and 25 and has the effect of overriding the $N_1$ and $N_0$ components of the fault report. Similarly, in FIG. 11, for example, the RESET signal clears flip-flop 46, causing its "Q" output terminal to assume a low or "false" level.

In general, the RESET signal is employed after a repair action has been taken or any other system power up operation, or upon the completion of a system reconfiguration. With continued reference to FIG. 17, the RESET signal enables the Fault Status Filters 20 and 20a and Fault Selectors 30 and 30a to be reinitialized to a no-fault state. This condition is independent of the separate logic "false" Fault Report signals derived from the system under test. Assuming that there are no faults in the generalized fault reporting system itself, as distinguished from faults in the system under test, the signals from each level of the Isolation Data modules, such as 40 and 40a, from the lowest to the highest system level will all be "false". The latter level appearing on lines 81 are applied to OR gate 82, the output of which is inverted in inverter 83 and applied to the "D" terminal of flip-flop 84. It is assumed that the RESET signals are present at two succeeding clock times. Accordingly, the second RESET signal, causes the "Q" output terminal of flip-flop 84 to become "true", thereby providing an ENABLE pulse on line 85 to one of the pair of input terminals of AND gate 86. Thereafter, CLOCK pulses applied to the other input terminal of AND gate 86, result in a POLL signal output from the latter and is applied to the Fault Status Filter 20 in the manner described in FIG. 5. The operation of the present invention then proceeds as indicated hereinbefore.

On the other hand, after the application of the initial RESET signal, if one or more of the outputs on lines 81 are "true", the implication is that the fault reporting system itself is defective. Accordingly, as a result of inverter 83, the input to flip-flop 84 will be "false", and the latter will not generate an ENABLE pulse on line 85 at the succeeding RESET time. AND gate 86 will not be enabled, and in the absence of POLL signals, the fault reporting process will be halted, and will remain in this state until corrective action is taken within the fault reporting system. Thus, the logic configuration of FIG. 17 both initializes the reporting process, while providing a self-test of the system of the present invention.

In conclusion, there has been described a generalized fault reporting system that emphasizes accuracy in isolating faults. The system finds particular application in the complex system architecture of VLSI components, where it effectively determines the correct isolation of faults detected by the VLSI test circuits. As noted hereinbefore, a component iself may appear to be defective, but in fact, the detected fault may originate in another interfacing component and be transmitted to the former. The present system provides the capability of identifying the source of the fault.

It is apparent that depending upon the architecture of the particular system under test, changes and modifications of the present fault reporting system as described hereinbefore may be required. Such changes and modifications insofar as they are not departures from the true scope of the invention, are intended to be covered by the claims which follow.

What is claimed is:

1. A fault reporting system for isolating faults to a particular circuit element or elements based upon error signals detected therefrom comprising in combination:
    fault encoder means coupled to each circuit element for encoding the detected error signals in accordance with a predetermined classification of fault sources, said fault encoder means providing respective fault reports for the circuit elements based upon said classification,
    fault status filter means coupled to said fault encoder means for receiving said fault reports and for comparing each current report with the preceding report for the same circuit element, said fault status filter means generating a trigger signal in response to a difference in the last mentioned reports,
    fault selector means coupled to said fault status filter means, said fault selector means being comprised of a plurality of logic circuits which are divided into a plurality of partitions, each of said partitions being comprised of logic circuits conforming to the electrical connectivity between a given circuit element and any other circuit element, said logic circuits in each partition receiving respective fault reports derived from said fault status filter means for said given circuit element and for any other circuit element coupled thereto which receives an external output therefrom,
    said trigger signal generated by said fault status filter means being applied to said logic circuits in each partition, said logic circuits providing an isolation data output signal level in response to said trigger signal which is indicative of the presence of a fault in said given circuit element.

2. A fault reporting system as defined in claim 1 characterized in that said predetermined classification of fault sources includes three categories of faults, namely, internal, external and undetermined.

3. A fault reporting system as defined in claim 2 further characterized in that said fault encoder means includes a plurality of OR gates each having a plurality of input terminals and an output terminal, a first, second and third of said OR gates being dedicated to receive respectively on their input terminals error signals from said internal, external and undetermined fault sources, a fourth and fifth of said OR gates, the output terminals of said first and second OR gates being coupled respectively to an input terminal of said fourth and fifth OR gates, the output terminal of said third OR gate being coupled in common to another input terminal of both said fourth and fifth OR gates, said fault report for a given circuit element being comprised of the signal levels appearing simultaneously on the output terminals of said fourth and fifth OR gates, said signal levels of said fault report indicating the presence or absence of a detected fault, and if the former, the category of the fault.

4. A fault reporting system as defined in claim 3 wherein said fault status filter means is comprised of a pair of D-type flip-flops for receiving on their respective "D" input terminals said signal levels of said fault report for said given circuit element, comparator means coupled to each of said flip-flops for comparing each of the current signal levels of said fault report with the corresponding preceding level stored in one of said flip-flops, means for generating said trigger pulse in response to a difference in the signal levels, and means for applying a poll signal concurrently to the CLK terminals of said flip-flops for setting the latter to respective states indicative of said current signal levels.

5. A fault reporting system as defined in claim 4 wherein said comparator means includes a pair of exclusive-OR gates each having a pair of input terminals and an output terminal, a first of said last mentioned input terminals being coupled respectively to the output terminals of said pair of flip-flops, the second of said input terminals of said exclusive-OR gates being coupled to receive the respective corresponding signal levels of said fault report for said given circuit element, and an OR gate coupled in common to the output terminals of said exclusive-OR gates for providing said trigger pulse.

6. A fault reporting system as defined in claim 5 characterized in that said electrical connectivity between a given circuit element and any other circuit element is defined by an interconnection matrix wherein the relationship of each of said given circuit elements arranged in "rows" is defined with respect to said other circuit elements arranged in "columns", said relationship being identified as one of the following types, namely, no connectivity, internal connectivity, external input from the column components, external output to a column component, and a combination of the last two types.

7. A fault reporting system as defined in claim 6 wherein said logic circuits in each partition of said fault selector means include circuits representative respectively of said internal connectivity and external output connectivity types as specified in said interconnection matrix for each given "row" circuit element.

8. A fault reporting system as defined in claim 7 wherein said logic circuit representative of said internal connectivity is comprised of a first and a second AND gate each having a pair of input terminals and an output terminal, inverter means coupled to an input terminal of said first AND gate, means for applying a first signal level of the fault report of a given "row" circuit element to said inverter means and to an input terminal of said second AND gate, means for applying the second signal level of said last mentioned fault report in common to the respective other input terminals of said first and second AND gates, the signals appearing on the output terminals of said first and second AND gates being indicative respectively of internal and undetermined faults in said given "row" circuit element.

9. A fault reporting system as defined in claim 8 wherein said logic circuit representative of said external output connectivity is comprised of a first and a second AND gate each having a pair of input terminals and an output terminal, inverter means coupled to an input terminal of said first AND gate, said second signal level of the fault report of a "column" circuit element which receives an external output from said given "row" circuit element being applied to said inverter means and to an input terminal of said second AND gate, said first signal level of said last mentioned fault report being applied in common to the respective other input terminals of said first and second AND gates, the signals appearing on the output terminals of said first and second AND gates being indicative respectively of external and undetermined faults in said given "row" circuit element.

10. A fault reporting system as defined in claim 9 further characterized in that said logic circuits in each partition of said fault selector means includes an OR gate having a plurality of input terminals and an output terminal, the output terminals of the plurality of AND gates of said circuits representative of said internal connectivity and external output connectivity types being coupled respectively to said input terminals of said last mentioned OR gate, a D-type flip-flop having a "D" input terminal, a "Q" output terminal, a CLK terminal and a CLR terminal, the output terminal of said OR gate being coupled to the "D" terminal of said flip-flop, the application of said trigger signal generated by said fault status filter means to said CLK terminal of said flip-flop resulting in an isolation data output level on the "Q" terminal of the latter, said isolation data being indicative of a fault in the circuit "row" element with which the partition of logic circuits is identified.

11. A fault reporting system as defined in claim 10 wherein said circuit element is an electronic component situated in the lowest level of the operating equipment.

12. A fault reporting system as defined in claim 11 wherein said isolation data for said electronic component in said lowest level of said operating equipment is applied to said fault report encoder means for the second lowest level of said last mentioned equipment and represents detected error signals to be encoded into a fault report.

13. A fault reporting system as defined in claim 10 wherein said circuit element is a subsystem situated in the second highest level of said operating equipment.

14. A fault reporting system as defined in claim 13 wherein said isolation data for said subsystem is applied to said fault report encoder means for the highest level of said operating equipment.

15. A fault reporting system as defined in claim 10 further including circuit means for initialization and self-test, said circuit means comprising reset means for resetting the D-type flip-flops of the fault status filter means and the fault selector means to all levels of the system under test for faults, an OR gate having a plurality of input terminals and an output terminal, means coupling the isolation data output levels from the highest level of said system under test to the respective input terminals of said OR gate, an additional D-type flip-flop, inverter means coupling the output terminal of said OR gate to the "D" input terminal of said last mentioned flip-flop, said reset means being applied to said additional D-type flip-flop, an AND gate having a pair of input terminals and an output terminal, the "Q" output terminal of said latter flip-flop being coupled to one input terminal of said AND gate, means for applying clock pulses to the other input terminal of said AND gate, the output terminal of said AND gate being coupled in common to the CLK terminals of said pair of D-type flip-flops of said fault status filter, said poll signal being derived from said clock signals and appearing on the output terminal of said AND gate.

* * * * *